United States Patent [19]

Zeiringer

[11] 4,321,833

[45] Mar. 30, 1982

[54] TRANSDUCER DEVICE FOR MEASURING THE INTERNAL PRESSURE IN A PIPE

[75] Inventor: Rudolf Zeiringer, Graz, Austria

[73] Assignee: Hans List, Graz, Austria

[21] Appl. No.: 181,850

[22] Filed: Aug. 27, 1980

[30] Foreign Application Priority Data

Sep. 7, 1979 [AT] Austria ............................ 5937/79

[51] Int. Cl.³ ............................................. G01L 7/04
[52] U.S. Cl. ................................ 73/730; 73/119 A;
73/756
[58] Field of Search ..................... 73/730, 119 A, 756

[56] References Cited

U.S. PATENT DOCUMENTS

| | | | |
|---|---|---|---|
| 4,090,404 | 5/1978 | Dupont et al. | 73/119 A |
| 4,194,401 | 3/1980 | Claassen et al. | 73/730 |
| 4,216,403 | 8/1980 | Krempl et al. | 73/119 A |

*Primary Examiner*—Donald O. Woodiel
*Attorney, Agent, or Firm*—Watson, Cole, Grindle & Watson

[57] ABSTRACT

A transducer device for measuring the internal pressure in pipe comprises a housing made of two parts, a connecting element which acts for a hinge connection between the housing parts, and a chucking device for clamping the housing parts onto the pipe. To enable a simple handling and mounting of the device and to avoid effects on the measuring signals resulting from mechanical vibrations of the pipe, the chucking device is performed as a snapping catch and comprises a clamp and a spring clip. The clamp is hinged supported at that side of one of the housing parts being opposite the connecting element. The spring clip is hinged supported at the clamp and coacts in locked position of the chucking device with a notch arranged on the other one of the housing parts.

6 Claims, 6 Drawing Figures

TRANSDUCER DEVICE FOR MEASURING THE INTERNAL PRESSURE IN A PIPE

BACKGROUND OF THE INVENTION

This invention relates to a transducer device for measuring the internal pressure in a pipe, comprising a housing made of two parts, a connecting element which acts for a hinge connection between the housing parts, and a chucking device for clamping the housing parts onto the pipe.

DESCRIPTION OF THE PRIOR ART

A transducer device of the kind mentioned above is known from U.S. Pat. No. 4,090,404 and comprises two housing parts which are hinged connected by means of a hinge joint and a chucking device consisting of a screw bolt, a washer and a nut. The bolt is hinged on one of the housing parts by means of an axis fixed to the unthreaded end of the bolt and running parallel to the axis of the hinge joint and enables the clamping of the two housing parts or the clamping of the transducer device to the pipe, respectively, by an interaction between a suitable recess at the other one of the housing parts and the washer which is loaded by the nut on the threaded part of the bolt. This known arrangement has the drawback that on the one hand the assembly and reassembly of the transducer device is complicated and needs suitable tools and on the other hand, being of much greater importance, the bearing pressure of the two housing parts loaded by means of the bolt and nut to the surface of the pipe is very difficult to reproduce. Thereby, as transducer devices of the kind mentioned above measure changes in pressure in the pipe via changes in the surface geometry of the pipe, uncontrollable or changing effects on the result of the measurement are unavoidable. Furthermore, the total mass of this known transducer device is increased by the mentioned chucking device, whereby an increased sensitivity of the measuring signal with regard to mechanical vibrations of the pipe is resulting.

SUMMARY OF THE INVENTION

It is an object of the present invention to improve a transducer device of the kind mentioned above so as not only to simplify the handling thereof, but also to reduce the effects on the measuring signal resulting directly from the chucking device.

Therefore, a transducer device of the kind mentioned above is provided according to this invention with a chucking device which is performed as a snapping catch and comprises a clamp and a spring clip. The clamp is hinged supported at that side of one of the housing parts which is opposite the connecting element between the two housing parts. The spring clip is hinged supported at the clamp coacts in the locked position of the chucking device with a notch arranged on the other one of the housing parts. Thanks to the provision of the spring clip and the clamp for tensioning the spring clip the clamping force excited on the two housing parts via the chucking device is always the same and the effect thereof on the measuring signal neglectible. Furthermore, no special tool is necessary to tighten or to release the chucking device and the handling of the transducer device is relieved, e.g., when used at hardly accessible positions. The clamp and the spring clip can be performed very small and light weighted, whereby the total mass of the transducer device is not significantly increased and the sensitivity of the transducer device regarding mechanical vibrations of the pipe onto which it is clamped is reduced.

According to a further development of this invention it is possible to sheath the clamp with an elastic vibration damping, e.g., plastics, material. As the clamp on the one hand acts direct for the transfer of force between the housing part onto which it is hinged and the spring clip coacting with a notch on the other housing part and on the other hand tends to take over mechanical vibrations being transmitted via the pipe to the transducer device and superpose these vibrations to the clamping force between the two housing parts—this would cause an effect on the measuring signal—it is very advantageous to suppress mechanical vibrations of the clamp relative to the housing part onto which it is fixed. From this point of view the sheathing with an elastic vibration camping material, e.g., plastics, is very simple and effective.

According to another embodiment of this invention the clamp is supported, preferably near the free end thereof, at the housing in the locked position of the chucking device. This also is a very effective, simple and advantageous possibility to prevent mechanical vibrations of the clamp relative to the housing of the transducer device.

According to a further development of this invention a holding device is arranged at the chucking device and, with regard to the chucking device, the spring clip is so kept by the holding device as to fold back at the opening of the chucking device via a dead center against the clamp and stay in this first position, and snap into a second position when turned in front via the dead center, in which second position the spring clip is directly engaging with the notch when the chucking device is closed. As the relative position between the clamp and the spring clip is thereby secured at the opening as well as at the clamping of the chucking device the transducer device can be handled with one hand, whereby the assembly especially at badly accessible positions is improved.

DESCRIPTION OF THE DRAWINGS

The present invention is hereinafter more particularly described with reference to exemplary embodiments depicted in the accompanying drawings, wherein.

DESCRIPTION OF THE PREFERRED EMBODIMENTS

Figure 1:
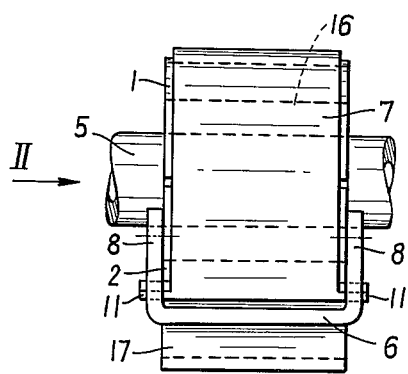
FIG. 1 shows a transducer device with a chucking device according to the invention.
Figure 2:
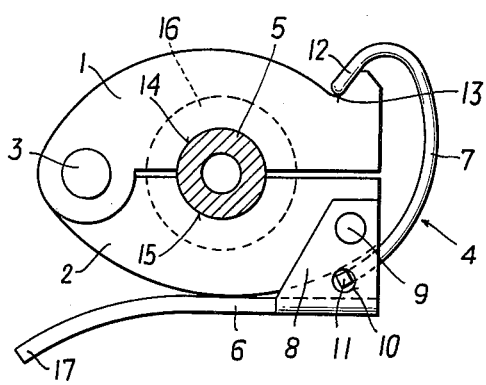
FIG. 2 shows a view along arrow II in FIG. 1.

A transducer device according to FIGS. 1 and 2 comprises two housing parts 1 and 2 which are connected by means of a bolt 3 and clamped to a pipe 5 by means of a chucking device 4. The chucking device 4 comprises a clamp 6 and a spring clip 7. The clamp 6 shows two bended over projections 8 at which it is supported at the side of the housing part 2 opposite the bolt 3 by means of tenons 9 provided at the housing part. The clamp 6 is made from pressed sheet-metal and shows openings 10 in the projections 8 which serve as bearings for lugs 11 at the spring clip 7. The spring clip 7 is made from spring steel and its front end 12 is engaging with a notch 13 provided at the other housing part 1 when the chucking device 4 is closed.

As the triangle built in FIG. 2 by the notch 13, the tenon 9 and the lug 11 points with its obtuse angle at the tenon 9 in the direction to the spring clip 7 it is ensured that the chucking device 4 stays after crossing a dead center in its locked position like a snapping catch and acts, because of constant geometry, with an ever constant clamping force on the housing parts 1 and 2.

Both the housing parts 1 and 2 are seated with clearances 14, 15 on the surface of the pipe 5, whereby a firm support for the transducer device at the pipe 5 and a removal of the clamping force loaded by the chucking device 4 from the measuring element 16 is obtained.

When the chucking device 4 is closed the clamp 6 is supported directly at the housing part 2 and the free end 17 of the clamp 6 is bended away from the housing to relieve the operation.

Figure 3:
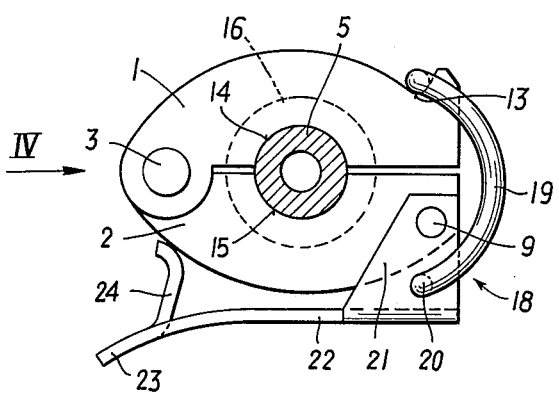
FIG. 3 shows another embodiment according to the invention.

The transducer device of FIG. 3 differs from the device according to FIGS. 1 and 2 only with respect to its different performed chucking device 18. The spring clip 19 is made, as can be seen also from FIG. 4, from a frame-like bended spring wire which is hinged supported at its both ends 20 in suitable openings in the bended projections 21 of the clamp 22. The free end 23 of the clamp 22 is supported at the housing part 2 by means of a support lug 24 locked out of the pressed sheet-metal of the clamp 22. Thereby, mechanical vibrations of the clamp 22 relative to the housing part 2, which via the spring clip 19 would cause changes in the clamping force and an undesired effect on the measuring signals, are largely prevented.

Figure 4:
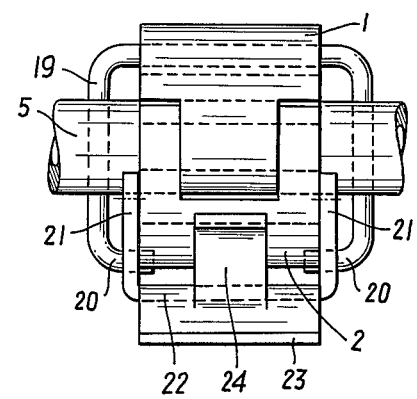
FIG. 4 shows a view along arrow IV in FIG. 3.
Figure 5:
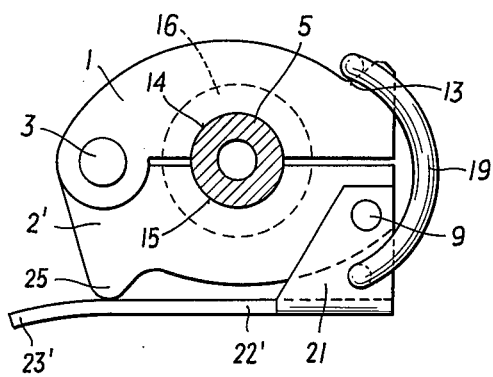
FIG. 5 shows a further embodiment according to the invention and FIG. 6 a detail of another embodiment according to the invention.

The transducer device according to FIG. 5 differs only with regard to the support of the free end 23' of the clamp 22' from the transducer device according to FIGS. 3 and 4. A cam 25 is provided at the housing part 2', which directly serves as a rest and support for the free end 23' of the clamp 22' and prevents vibrations of the clamp 22' relative to the housing part 2'.

Figure 6:
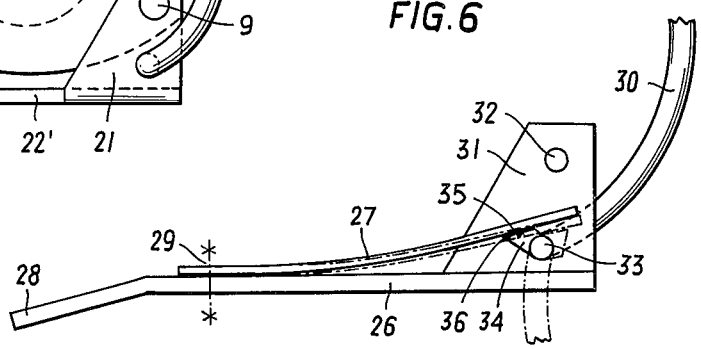

The clamp 26 of FIG. 6 shows at the side thereof near to the housing of the transducer device (not shown) a tongue 27 which is fixed near the free end 28 of the clamp 26 by means of a fastening 29 and reaches beyond the region of the support of the spring clip 30 at the projections 31, which projections also show openings 32 for a hinged support of the clamp 26 at the transducer housing.

The spring clip 30 shows at the end 34 thereof which reach beyond the bearing point 33 in the projections 31 bevelling 35 against which the tongue 27 is lying when the chucking device is closed. At the opening of the clamp 26 the spring clip 30 snaps after passing a dead center given by the upper edge 36 of the bevelling 35 into the position indicated by a dash-dotted line and stays in this position. The opening and dismounting of the transducer device is thereby significantly simplified, as the spring clip 30 cannot spuriously be caught again by the notch on the transducer housing.

To mount the transducer device the spring clip 30 is turned forward over the dead center in its other position relative to the clamp 26, which position is given by the tongue 27 and the end 34 of the spring clip 30. After that, the clamp 26—as far as it was not open, that means turned away from the transducer housing, before—is opened, the housing is closed over the pipe and then the clamp 26 is again turned back to the housing, whereat—because of the relative position between the clamp and the spring clip which is fixed until the spring clip 30 engages with the notch at the transducer housing—the spring clip 30 engages with the notch without any further guidance. Thereby, the handling of the transducer device at hardly accessible positions is simplified, as the chucking device can be operated with one hand.

I claim:

1. A transducer device for measuring the internal pressure in a pipe, comprising a housing made of two parts, a connecting element which acts for a hinge connection between said housing parts, and a chucking device for clamping said housing parts onto said pipe, said chucking device being performed as a snapping catch and comprising a clamp and a spring clip, said clamp is hinged supported at that side of one of said housing parts being opposite said connecting element, said spring clip is hinged supported at said clamp, and said spring clip coacts in locked position of said chucking device with a notch arranged on the other one of said housing parts.

2. A transducer device according to claim 1, wherein said clamp is sheathed with an elastic vibration damping material.

3. A transducer device according to claim 2, wherein said clamp is sheathed with a plastics material.

4. A transducer device according to claim 1, wherein said clamp is supported at said housing in the locked position of said chucking device.

5. A transducer device according to claim 4, wherein said clamp is supported near the free end thereof in the locked position of said chucking device.

6. A transducer device according to claim 1, wherein a holding device is arranged at said chucking device and, with regard to said chucking device, said spring clip is so kept by said holding device as to fold back at the opening of said chucking device via a dead center against said clamp and stay in this first position, and snap into a second position when turned in front via said dead center, in which second position said spring clip is directly engaging with said notch when said chucking device is closed.

* * * * *